(12) United States Patent
Fujii

(10) Patent No.: US 6,209,858 B1
(45) Date of Patent: Apr. 3, 2001

(54) BICYCLE SHOCK ABSORBER LINKED TOGETHER THROUGH FIRST AND SECOND ANNULAR MEMBERS

(75) Inventor: Kazuhiro Fujii, Sakai (JP)

(73) Assignee: Shimano, Inc., Osaka (JP)

( * ) Notice: Subject to any disclaimer, the term of this patent is extended or adjusted under 35 U.S.C. 154(b) by 0 days.

(21) Appl. No.: 09/281,633

(22) Filed: Mar. 30, 1999

(30) Foreign Application Priority Data

Mar. 31, 1998 (JP) .................................................. 10-087121

(51) Int. Cl.[7] .......................................................... F16F 7/12
(52) U.S. Cl. .......................... 267/201; 267/279; 267/292; 280/259
(58) Field of Search ...................................... 267/189, 201, 267/257, 279, 292, 153, 141, 280, 276; 280/259, 260, 261, 283

(56) References Cited

U.S. PATENT DOCUMENTS

| | | | | |
|---|---|---|---|---|
| 1,753,489 | * | 4/1930 | Weinhardt | 267/279 |
| 2,729,442 | * | 1/1956 | Neidhart | 267/257 |
| 2,915,306 | * | 12/1959 | Hickman | 267/280 |
| 3,012,767 | * | 12/1961 | Jones, Sr. | 267/257 |
| 3,087,716 | * | 4/1963 | Nilsson | 267/257 |
| 3,202,410 | * | 8/1965 | Schell | 267/153 |
| 3,436,069 | * | 4/1969 | Henschen | 267/279 |
| 3,473,797 | * | 10/1969 | Selzer | 267/279 |
| 5,121,937 | | 6/1992 | Lawwill | 280/284 |
| 5,411,287 | | 5/1995 | Henschen | 280/717 |
| 5,660,406 | * | 8/1997 | Menze, sen. | 280/276 |
| 5,997,022 | * | 12/1999 | Matsui | 280/284 |

FOREIGN PATENT DOCUMENTS

| | | |
|---|---|---|
| 302878 | 4/1997 | (CN) . |
| 4233596 A1 | 4/1994 | (DE) . |
| 9-290790 | 11/1997 | (JP) . |

OTHER PUBLICATIONS

U. S. patent application, Ser. No. 08/887,306, filed Jul. 2, 1997.

* cited by examiner

Primary Examiner—Robert J. Oberleitner
Assistant Examiner—Xuan Lan Nguyen
(74) Attorney, Agent, or Firm—James A. Deland

(57) ABSTRACT

A shock absorber for mounting between a first frame member and a second frame member of a bicycle includes a first member adapted to couple to the first frame member and a second member disposed within the first member and adapted to couple to the second frame member. The first and second members rotate relative to each other, and an elastic member is disposed between the first member and the second member so that the elastic member expands and contracts in response to relative rotation of the first member and the second member. A linking mechanism couples the first member with the second member so that the first member and the second member are axially and radially immovable relative to each other.

27 Claims, 8 Drawing Sheets

US 6,209,858 B1

BICYCLE SHOCK ABSORBER LINKED TOGETHER THROUGH FIRST AND SECOND ANNULAR MEMBERS

BACKGROUND OF THE INVENTION

The present invention is directed to bicycle components and, more particularly, to a bicycle shock absorber wherein the shock absorber elements are linked together through first and second annular members coupled to corresponding first and second tubular members.

Cycling grows in popularity not only as a transportation means but, to a greater extent, as a mode of recreation. In addition, cycling is a popular competitive sport for professionals and amateurs. It is known that mountain and road bicycles are currently provided with front or rear suspensions to absorb shocks transmitted to the rider both on and off the road. Numerous structures, ranging from simple to complex, are used for such suspensions. For example, Japanese Unexamined Patent Application 9-290790 teaches an inexpensive bicycle suspension with a simple structure. This suspension comprises a cylindrical external member with a plurality of projections extending inwardly and an internal member mounted inside the external member and having a plurality of projections extending radially outwardly, wherein the plurality of projections extending from the external member radially face the plurality of projections extending from the internal member. Elastic members are mounted between the external member and the internal member and are compressionally deformed by the relative rotation of the two members. Side plates are integrally attached to both ends of the internal member. The external and internal members may be integrally linked to respective front and rear frame members of the bicycle, wherein the rear frame member is fixed to the side plates.

In the conventional structure described above, the internal member is prevented from axial movement by the side plate attached to the internal member. However, the internal member and external member sometimes slip in the radial direction when the rider mounts the bicycle or when a shock is applied to the frame. When the two members slip in the radial direction, there is a risk that they will come into contact and sustain damage.

SUMMARY OF THE INVENTION

The present invention is directed to a bicycle shock absorber of the type having a second member disposed within a first member for relative rotation between the two, wherein the first member and the second member are axially and radially immovably linked together. In one embodiment of the present invention, a shock absorber for mounting between a first frame member and a second frame member of a bicycle includes a first member adapted to couple to the first frame member and a second member disposed within the first member and adapted to couple to the second frame member. The first and second members rotate relative to each other, and an elastic member is disposed between the first member and the second member so that the elastic member expands and contracts in response to relative rotation of the first member and the second member. A linking mechanism couples the first member with the second member so that the first member and the second member are axially and radially immovable relative to each other.

In a more specific embodiment, the first member has a circular outer peripheral surface and a circular end surface. In this embodiment the link mechanism includes a first bushing fixed to the first member and a second bushing fixed to the second member. The first bushing include a first cylindrical part contacting the circular outer peripheral surface of the first member and a first annular part folded away from the first cylindrical part and contacting the circular end surface of the first member. The second bushing includes a second cylindrical part contacting the first cylindrical part of the first bushing, and a second annular part folded away from the second cylindrical part and contacting the first annular part of the first bushing.

In yet another embodiment of the present invention, the shock absorber includes a first member adapted to couple to the first frame member, a second member adapted to couple to the second frame member, and a linking mechanism concentrically coupling the first member with the second member so that the first member rotates relative to the second member. An elastic member is disposed between the first member and the second member so that the first elastic member expands and contracts in response to relative rotation of the first member and the second member. In this embodiment, the link mechanism includes a first bushing retained to the first member and a second bushing retained to the second member. The first bushing includes a first tubular part and a first annular part folded away from the first tubular part, and the second bushing includes a second tubular part and a second annular part folded away from the second tubular part.

DETAILED DESCRIPTION OF THE EMBODIMENTS

Figure 1:
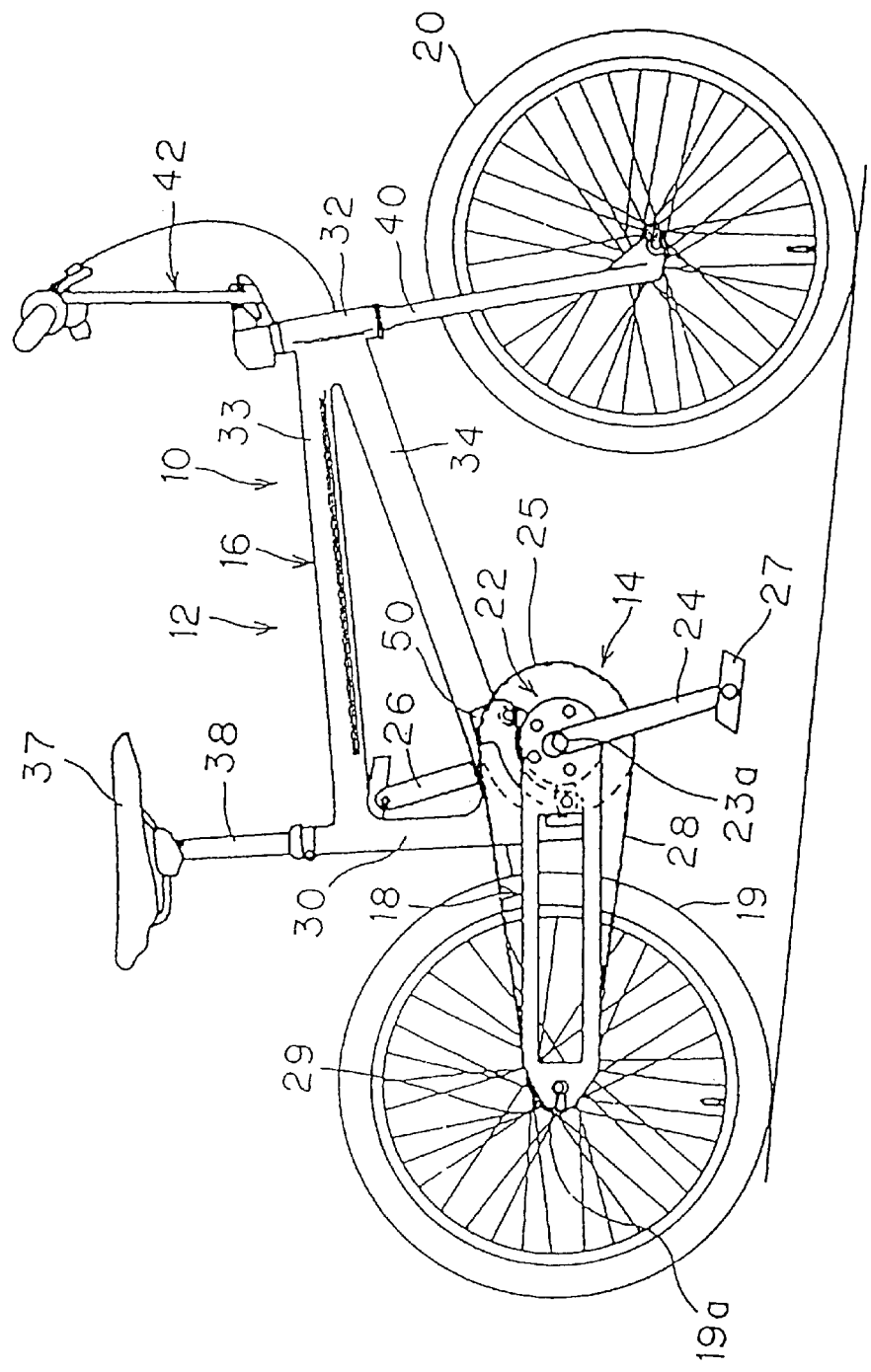
FIG. 1 is a side view of a bicycle that includes a particular embodiment of a shock absorber according to the present invention.
Figure 2:
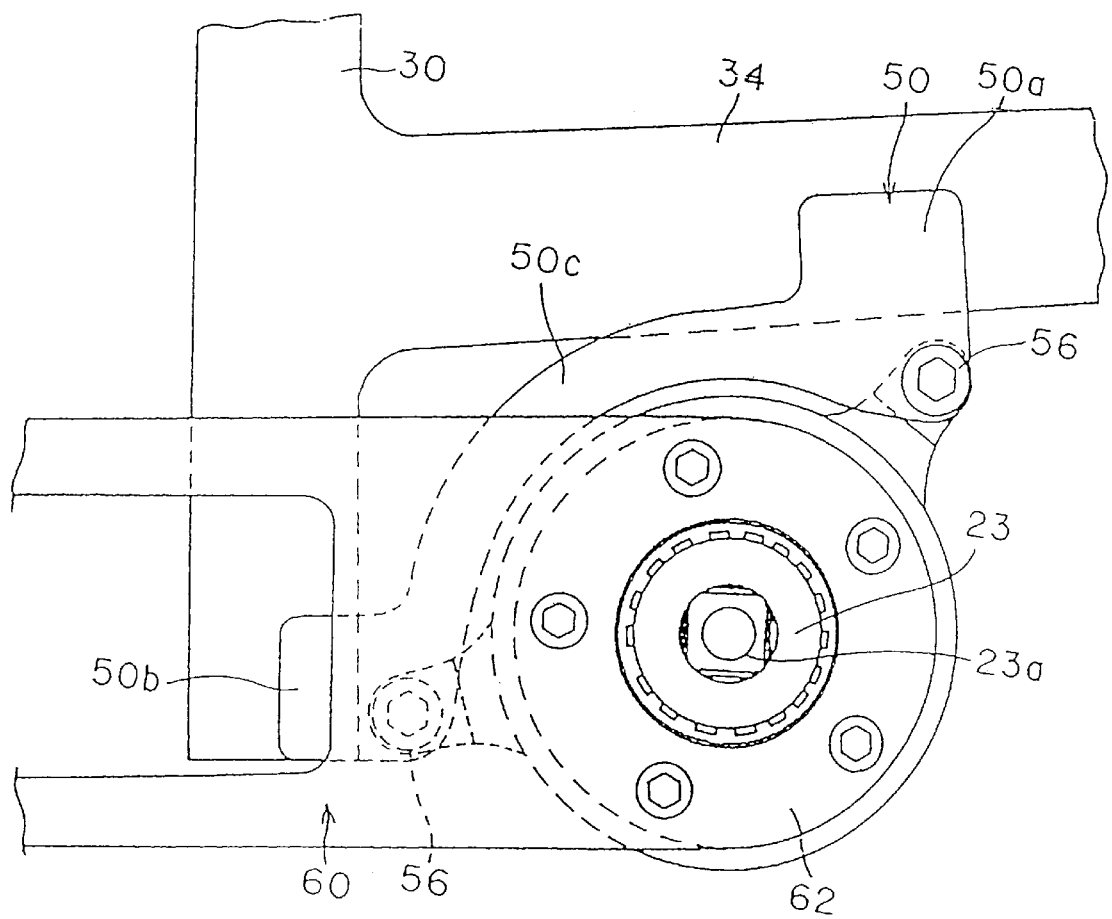
FIG. 2 is a more detailed view of the pedal drive area of the bicycle shown in FIG. 1.

In FIGS. 1 and 2, the bicycle 10 in which an embodiment of the present invention is employed is a BMX-type bicycle provided with a frame 12 and a suspension assembly 14. The frame 12 primarily has a main frame member (an example of a first frame member) 16 and a rear frame member (an example of a second frame member) 18 elastically linked to the main frame member 16 via the suspension assembly 14.

Figure 3:
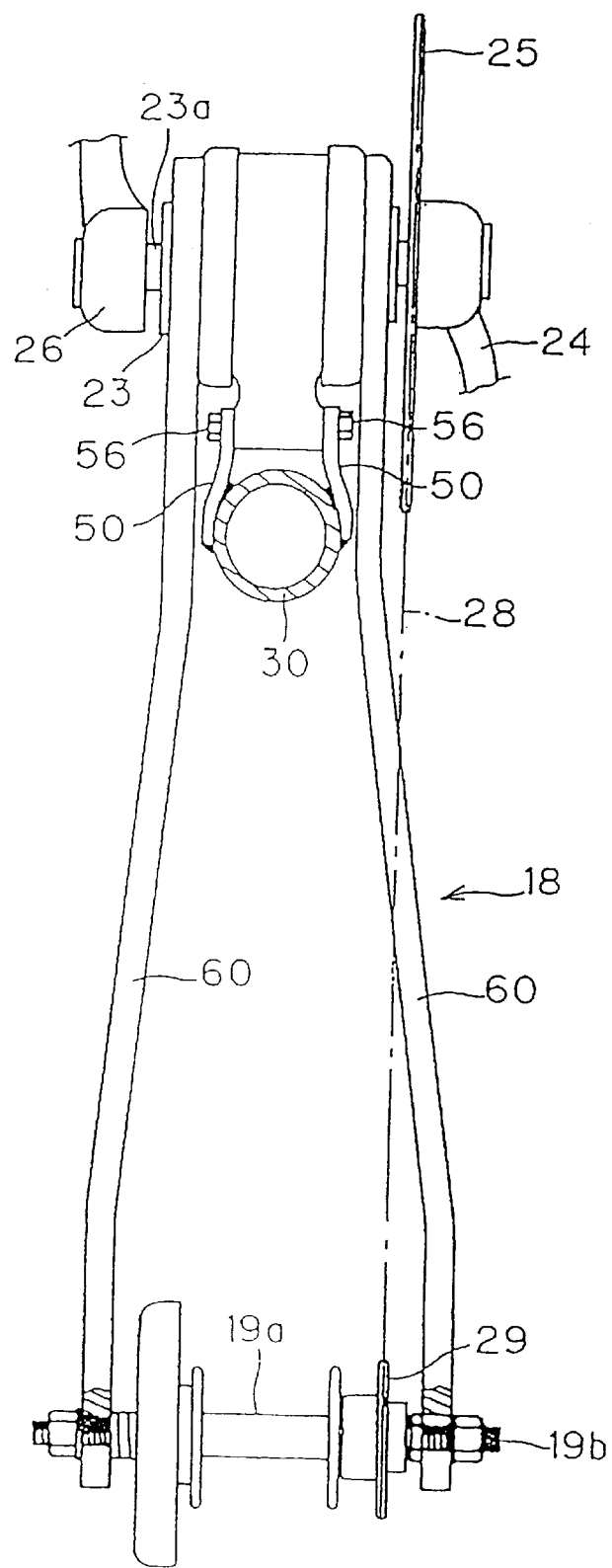
FIG. 3 is a top view of the driving parts of the bicycle shown in FIG. 1.

The bicycle 10 further comprises a rear wheel 19, which is mounted on the rear part of the frame 12 while allowed to rotate about a rear hub 19a; a front wheel 20, which is linked to the front part of the frame 12 while allowed to rotate about a front hub 20a; and a drive part 22 for propelling the bicycle. As shown in FIG. 3, the drive part 22 has the same structure as in the past; that is, it comprises a bottom bracket 23 (FIG. 4) having a bottom bracket axle 23a, a right crank 24 equipped with a front sprocket 25 and nonrotatably mounted on the right end of the bottom bracket axle 23a, a left crank 26 nonrotatably mounted on the left end of the bottom bracket axle 23a, a rear sprocket 29 mounted on the rear hub 19a, and a drive chain 28 passed over the two sprockets 25 and 29. A pedal 27 is mounted on the tip of either crank 24 and 26.

The main frame member 16 is composed of a plurality of rigid tubular members welded together. Specifically, the main frame member 16 has a seat tube 30, a head tube 32, an upper tube 33 for linking the two tubes 30 and 32, and a down tube 34. The main frame member 16 should preferably be manufactured using a rigid material such as a high-strength steel, chromium-molybdenum steel, aluminum alloy, titanium alloy, or other metal material; or a carbon composite or other such fiber-reinforced resin material. A seat post 38, with a saddle 37 mounted in the distal end thereof, is fixed to the seat tube 30 such that the vertical position thereof can be adjusted. A front fork 40 is rotatably mounted in the head tube 32. The front wheel 20 is rotatably mounted in the lower end of the front fork 40, and a steering handle assembly 42 is mounted on the upper end thereof such that the vertical position thereof can be adjusted.

A pair of brackets 50 for mounting the suspension assembly 14 are fixedly welded to the linkage portion of the down tube 34 and the seat tube 30. As shown in FIGS. 2 and 3, the brackets 50 have a first fixing part 50a, which is fixedly welded to the down tube 34; a second fixing part 50b, which is fixedly welded to the seat tube 30 diagonally underneath the first fixing part 50a; and a link 50c, which is bent into a quarter-circle segment and which links the two fixing parts 50a and 50b. Such brackets 50 allow the main frame member 16 to be reinforced by mounting the suspension assembly 14 and linking the down tube 34 and the seat tube 30. In addition, the main frame member 16 can be reinforced by linking the two tubes 34 and 30 with the aid of the suspension assembly 14 when the suspension assembly 14 is mounted separately on the tubes 34 and 30 without the use of the link 50c.

The suspension assembly 14 is mounted between the two brackets 50 and is fixed with bolts 56. Each of the brackets 50 is provided with two bolt holes (not shown) for receiving the bolts 56 therethrough. The dismounting of the suspension assembly 14 or the rear frame member 18 is thus facilitated by the detachable mounting of the suspension assembly 14 on the main frame member 16 with the bolts 56.

Figure 4:
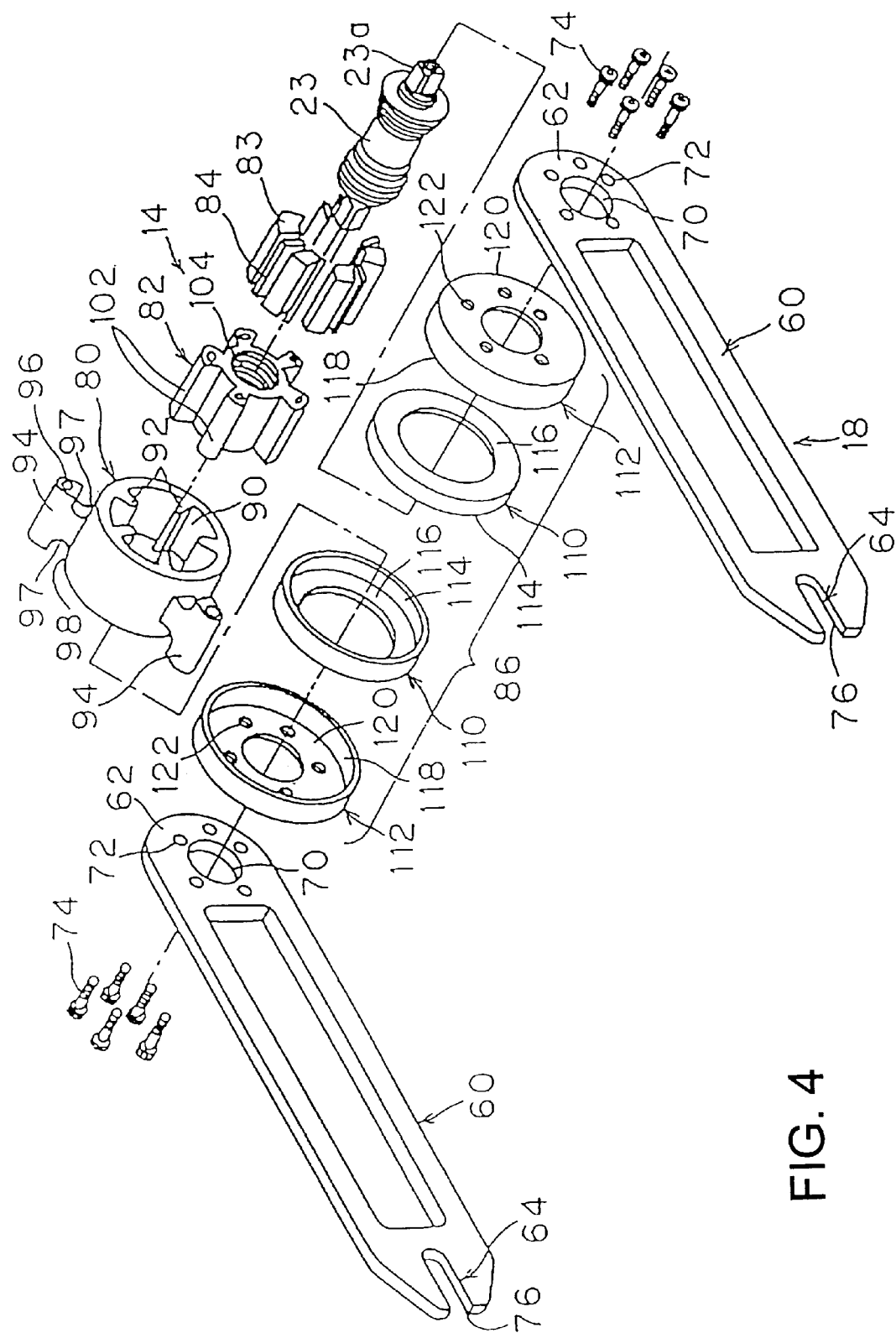
FIG. 4 is an exploded view of a particular embodiment of a shock absorber according to the present invention.

The rear frame member 18 has a pair of substantially identical arm members 60, as shown in FIG. 4. Each arm member 60 has a circular suspension-mounting part 62 at the base end and a hub-mounting part 64 at the distal end. The suspension-mounting part 62 is fixed in the internal member (see below) of the suspension assembly 14. The rear hub 19a is mounted between the two hub-mounting parts 64, and a hub axle 19b is fixed in the hub-mounting parts 64.

The suspension-mounting parts 62 have central holes 70 for accommodating the bottom bracket 23, and five bolt holes 72 for mounting bolts 74 are provided around each central hole 70. The bolts 74 are used to fix the suspension-mounting parts 62 to the internal member of the suspension assembly 14. The hub-mounting parts 64 are provided with slits 76 that extend in the longitudinal direction of the arm members 60, and the hub axle 19b of the rear hub 19a is fixed in these slits 76 by a known method.

Figure 5:
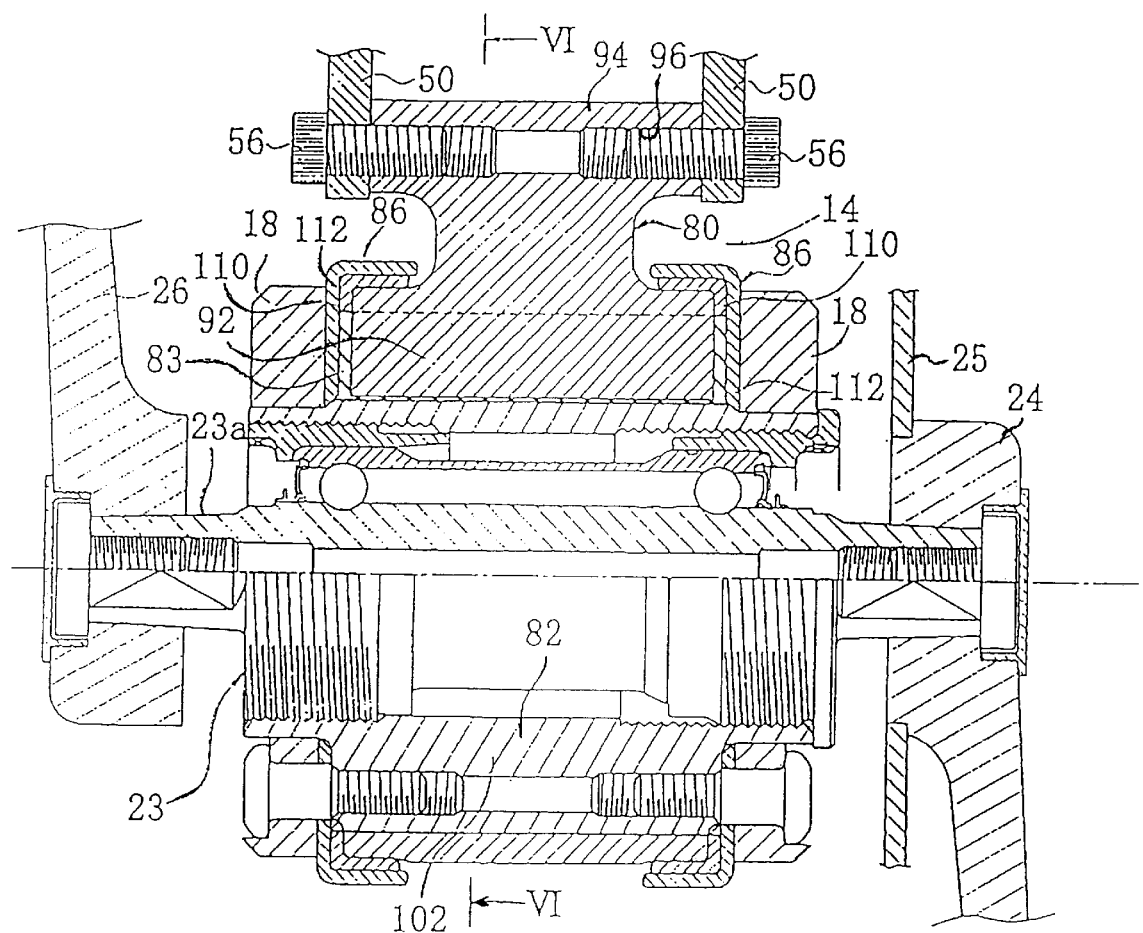
FIG. 5 is a cross-sectional view of the assembled bicycle shock absorber shown in FIG. 5.
Figure 6:
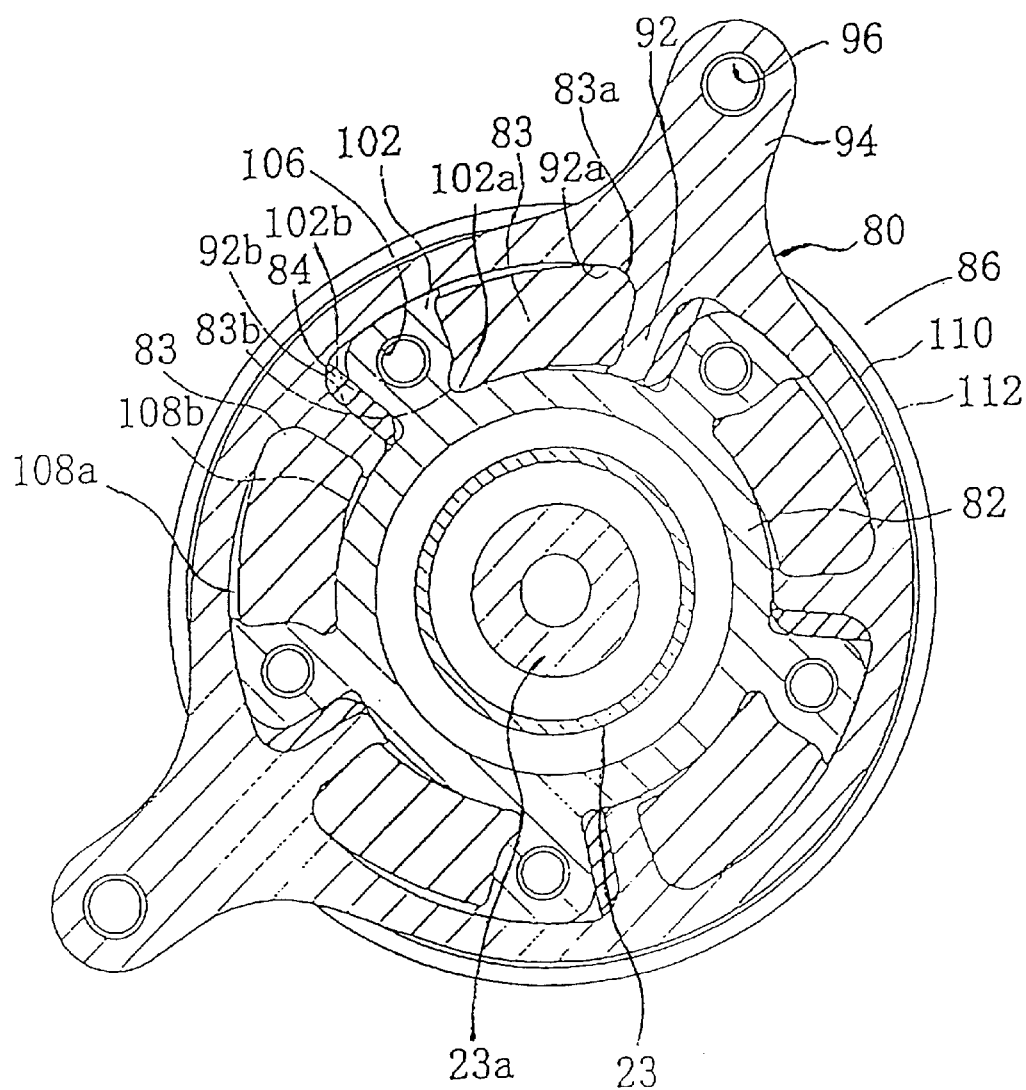
FIG. 6 is a view taken along line VI—VI in FIG. 5 showing the bicycle shock absorber in a rest state.

As shown in FIGS. 4–6, the suspension assembly 14 comprises an external member (first member) 80 fixed to the main frame member 16; an internal member (second member) 82 disposed around the inside of the external member 80 and fixed to the rear frame member 18; first and second elastic members 83 and 84, which are expanded and contracted by the relative rotation of the external member 80 and internal member 82; and a link mechanism 86 for concentrically positioning the external member 80 and internal member 82 and linking the two members 80 and 82 in a relatively rotatable and axially immovable fashion.

The external member 80 is a substantially cylindrical member that is made of metal and that has in its interior a circular opening 90 centered around a central axis extending to the right and left of the bicycle 10. Aluminum alloys, titanium alloys, chromium-molybdenum steel, high-strength steel, stainless-steel alloys, and the like are preferred as the metals for use in these. The internal member 82 can be accommodated together with the bottom bracket 23 and the two elastic members 83 and 84 in the opening 90. The opening 90 is formed such that its central axis coincides with the central axis of the bottom bracket 23 (axial center of the bottom bracket axle 23), and it is provided with five first protrusions 92 extending radially inward. As shown in FIG. 6, circularly beveled first retaining parts 92a are provided along the border between the outer circumferential surface of the external member 80 and the circumferential side of the base ends (roots) of the first protrusions 92. The angular portions 83a around the outside of the first elastic members 83 are kept in contact by these first retaining parts 92a.

Two mounting parts 94 extending radially outward are provided around the outside of the external member 80. The distal ends of each mounting part 94 are provided with screw holes 96 extending to a prescribed depth from both ends. These screw holes 96 are formed at positions that face the bolt holes of the brackets 50, and the suspension assembly 14 is mounted on the main frame member 16 by screwing the bolts 56 passing through the bolt holes of the brackets 50 into these screw holes 96. The base end of each mounting part 94 is provided with notches 97 cut out at both ends, and circular surfaces 98 are formed on the outer circumferential surfaces at the two ends of the external member 80.

The internal member 82 is a substantially cylindrical member made of metal and provided with a through hole 104 for the internal mounting of the bottom bracket 23 by a mounting technique based on the use of known screws. Aluminum alloys, titanium alloys, chromium-molybdenum steel, high-strength steel, stainless-steel alloys, and the like are preferred as the metals for use in these. Five second protrusions 102 extending radially outward are formed on the outer circumferential part of the internal member 82. The second protrusions 102 are disposed alternately with the first protrusions 92. As a result, it is possible to form two types of substantially rectangular spaces whose volume is varied by the relative rotation of the external member 80 and internal member 82 between the first protrusions 92 and the second protrusions 102. Of these, the first elastic members 83 are mounted in the wider spaces, and the second elastic members 84 are mounted in the narrower spaces. Circularly beveled second retaining parts 102a are provided along the border between the outer circumferential surface of the internal member 82 and the circumferential side of the base ends of the second protrusions 102. The angular portions 83b around the inside of the first elastic members 83 are kept in contact with these second retaining parts 102a.

The other circumferential surfaces 92b of the first protrusions 92 and the other circumferential surfaces 102b of the second protrusions 102 face each other in a substantially parallel fashion in a state in which the two elastic members 83 and 84 are mounted. Screw holes 106 for screwing in the bolts 74 are formed on the tip side of the second protrusions 102. The rear frame member 18 is fixed to the suspension assembly 14 and elastically linked to the main frame member 16 by screwing the bolts 74 into these screw holes 106 through the bolt holes 72 of the arm members 60.

In this embodiment, the first elastic members 83 are members manufactured from bar-shaped elastic bodies and provided with a deformed rectangular shape in cross section. Urethane rubber, nitrile rubber, polyethylene elastomer, or the like can be used for such elastic bodies. In the first elastic members 83, the angular portions 83a on the outer circumferential side in contact with the first protrusions 92 are rounded in the form of acute angles, as are the angular portions 83b on the inner circumferential side in contact with the second protrusions 102. The first elastic members 83 are mounted while pressure is applied to one of the spaces formed by the first protrusions 92 and second protrusions 102, and both ends thereof are brought into contact with a second bushing 112. The angular portions 83a are held by the first retaining parts 92a around the outside in areas of contact with the first protrusions 92, whereas the angular portions 83b are held by the second retaining parts 102a, which are disposed along the inner circumference diagonally from the first retaining parts 92a, in areas of contact with the second protrusions 102. The first elastic members 83 are thus held by the corresponding diagonally arranged retaining parts 92a and 102a, thus making it more difficult for the first elastic members 83 to slip in a manner other than that involving expansion in the thickness direction (direction that intersects the direction of contraction) as a result of a contraction occurring when the first elastic members 83 are compressed and deformed. The shock absorption performance can therefore be stabilized.

The first elastic members 83 are mounted in a secured state in one of the spaces while gaps 108a are formed near the inner circumferential surface of the external member 80. These gaps gradually become narrower in the clockwise direction away from the area of contact with the second protrusions 102. With such mounting, gaps 108b are also formed near the outer circumferential surface of the internal member 82. These gaps gradually become narrower in the counterclockwise direction away from the area of contact with the first protrusions 92. Because the first elastic members 83 are disposed such that the gradually narrowing gaps 108a and 108b are formed, the first elastic members 83, when gradually sandwiched and contracted between the protrusions 92a and 102a, can swell in the direction that intersects the contraction direction, making it possible to increase the amount of rotation for the members 80 and 82 and to ensure adequate shock absorption.

When the internal member 82 performs relative rotation, and the first elastic members 83 first contract and then expand into the gaps 108a and 108b, the first elastic members 83 gradually adhere to the inner circumferential surface of the external member 80 and to the outer circumferential surface of the internal member 82, lowering the amount of slippage in the area where adhesion-induced friction occurs, reducing the likelihood that the first elastic members 83 will be worn down, and making it possible to inhibit wear-induced variations in the shock absorption performance.

In this embodiment, the second elastic members 84 are made of substantially plate-shaped elastic bodies mounted for the purpose of applying pressure to the first elastic members and inhibiting the collision noise resulting from contact between the two protrusions 92 and 102. Urethane rubber, nitrile rubber, polyethylene elastomer, and the like are preferred for use in such elastic bodies. The other circumferential surfaces 92b of the first protrusions 92 and the other circumferential surfaces 102b of the second protrusions 102 face each other in a substantially parallel fashion in a state in which pressure is exerted by the second elastic members 84 on the first elastic members 83. Consequently, the gaps between the other circumferential surfaces 92b of the first protrusions 92 and the other circumferential surfaces 102b of the second protrusions 102 remain unchanged, and the pressure applied to the first elastic members 83 is less likely to vary when the second elastic members 84 slip in the radial direction. Here, applying pressure to the first elastic members 83 suppresses the movement of the suspension assembly 14 under the weight of the rider when the latter mounts the bicycle.

The link mechanism 86 has a first bushing 110 made of a synthetic resin and fixed to the external member 80, and a second bushing 112 made of metal, disposed around the outside of the first bushing 110, and fixed to the internal member 82. Polyacetal resins, nylon, Teflon (registered trade name), and other synthetic resins are preferred for use as the synthetic resins for the first bushing 110. Iron-based metals, copper, brass-based alloys, and other metals are preferred for use as the metals for the second bushing 112. The first bushing 110 is a flanged annular member having a first cylindrical part 114 in contact with the circular surfaces 98 of the external member 80 and a first annular part 116 folded away from the first cylindrical part 114 and kept in contact with the end face of the external member 80. The first bushing 110 is fixed by being fitted over the circular surfaces 98 of the external member 80.

The second bushing 112 is a flanged annular member having a second cylindrical part 118 in contact with the first cylindrical part 114 of the first bushing 110 and a second annular part 120 folded away from the second cylindrical part 118 and kept in contact with the first annular part 116 of the first bushing 110. Five bolt holes 122 are formed in the second annular part 120 at positions facing the five bolt holes 72. The second bushing 112 is fixed by the bolts 74 to the internal member 82 together with the rear frame member 18.

The shock-absorbing operation of the suspension assembly 14 will now be described.

Figure 7:
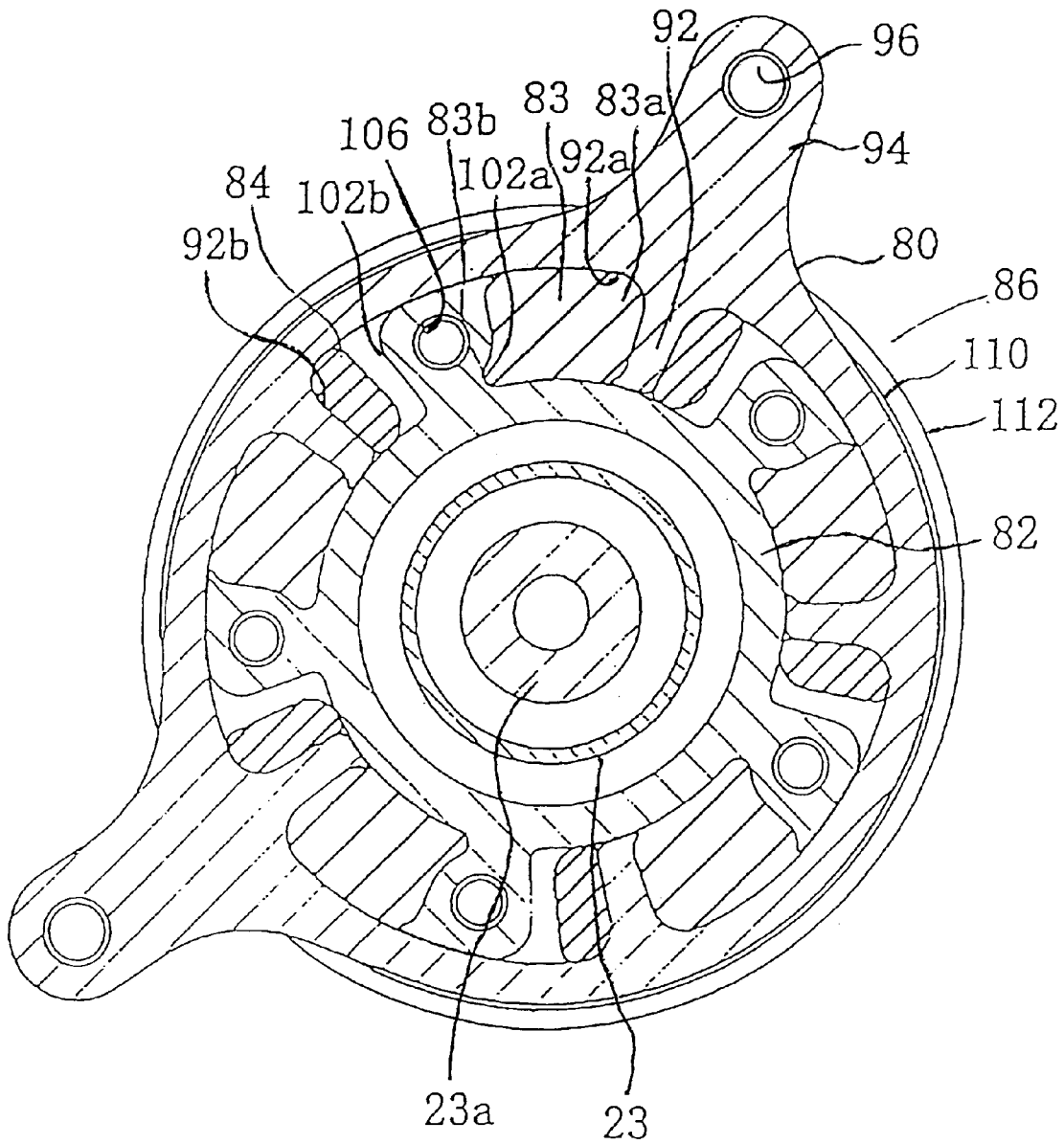
FIG. 7 is a cross-sectional view of the bicycle shock absorber in a shock absorbing state.

When a shock or load acts on the rear wheel 19, the rear frame member 18 rotates clockwise together with the internal member 82 about the bottom bracket axle 23a in FIG. 1. Such rotation about the bottom bracket axle 23a prevents the drive chain 28 from being stretched, loosened, or otherwise adversely affected in the manner encountered when rotation is induced in other areas. Pedaling loss and the like can therefore be suppressed. During the application of a shock or load to the bicycle, the first elastic members 83 are deformed by being compressed between the two protrusions 92 and 102, absorbing this shock or load. At this time, the gaps 108a and 108b between the first elastic members 83 and the external member 80 (and internal member 82) gradually become narrower, and if such compression continues until the gaps disappear (as shown in FIG. 7), the entire contact surface restricts the movement of the first elastic members 83, completing the stroke.

Figure 8:
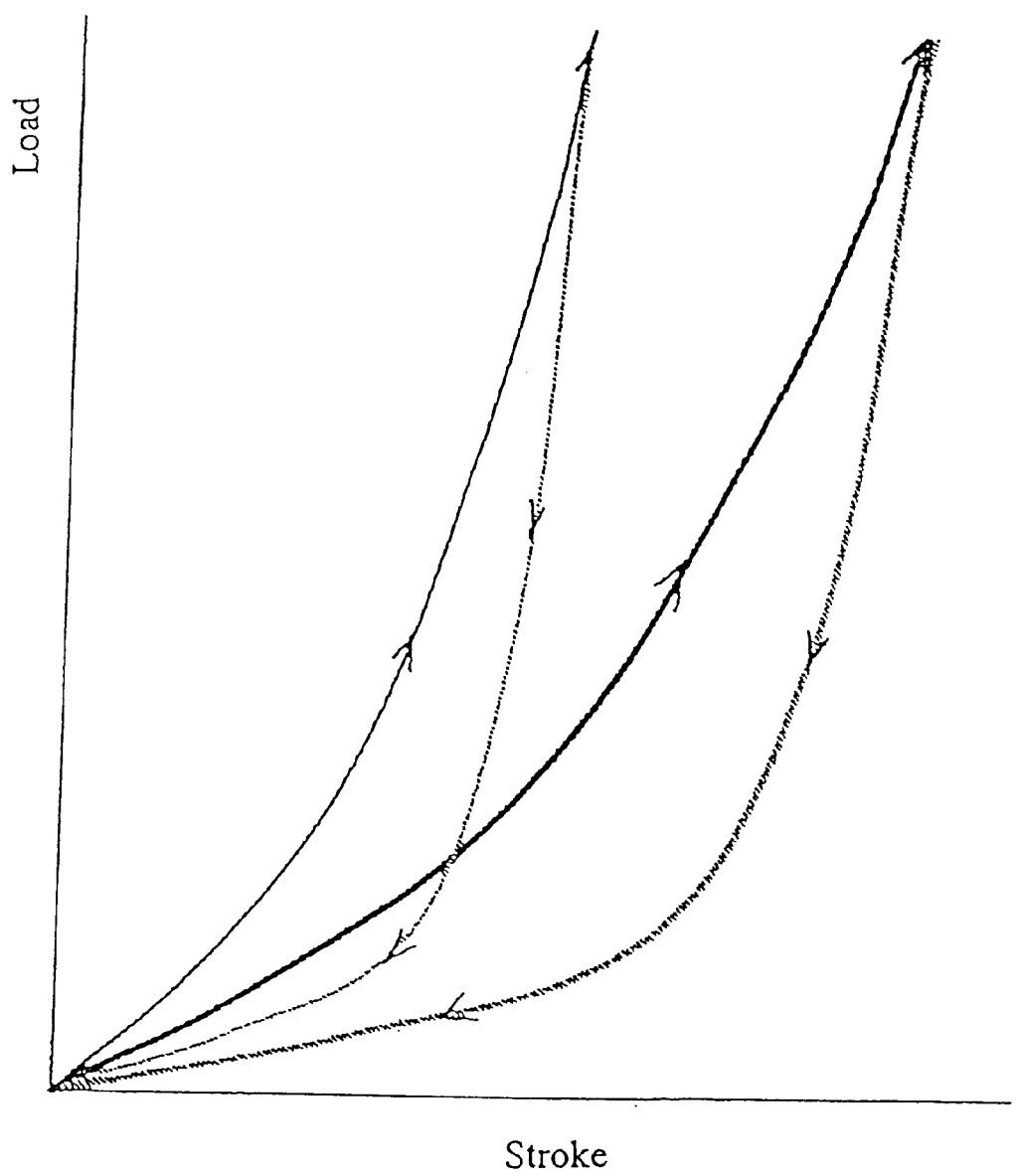
FIG. 8 is a graph illustrating the shock absorbing characteristics of the shock absorber shown in FIGS. 6 and 7.

Releasing the shock or load causes the first elastic members 83 to be expanded by elastic restoring force and returns the internal member 82 to its initial position. The corresponding relation between the load and the stroke of the internal member 82 is depicted in FIG. 8. Here, gaps 108a and 108b are formed between the first elastic members 83 and the external member 80 (and internal member 82), making it possible to obtain a large stroke in relation to the load (as shown by the bold line in FIG. 8) and widening the shock-absorbing range. The stroke decreases in relation to the load (as shown by the thin line in FIG. 8) in the absence of the gaps 108a or 108b.

Radial movement of the first elastic members 83 during compression is inhibited because the first elastic members 83 are held at two locations in the diagonal direction of bite during compression. Consequently, the shock absorption characteristics depicted in FIG. 8 always vary in a uniform manner, yielding a stable shock absorption performance. Furthermore, radial slippage of the external member 80 and the internal member 82 is inhibited because the two members 80 and 82 are linked by the link mechanism 86 in a relatively rotatable and axially immovable fashion. Consequently, contact between the members 80 and 82 during impact can be prevented, and the two members 80 and 82 are less likely to be damaged when a shock is applied.

While the above is a description of various embodiments of the present invention, further modifications may be employed without departing from the spirit and scope of the present invention. For example, the size, shape, location or orientation of the various components may be changed as desired. The functions of one element may be performed by two, and vice versa. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s).

Although the external and internal members had cylindrical shapes in the described embodiment, the shape of these two members is not limited to a cylindrical shape and includes rectangular columnar shapes and the like. Although in the link mechanism was composed of two flanged annular members in the described embodiment, the link mechanism may also have any other structure as long as the elastic member and the internal member are linked in a relatively rotatable and axially immovable fashion. Although the arm members were configured such that the hub axle of the rear wheel was chain-driven and supported at both ends in the described embodiment, it is also possible for the rear wheel to be shaft-driven by a bevel-gear shaft, and the hub axle of the rear wheel to be supported on one side. Although the external member was fixed to the main frame member and the internal member to the rear frame member in the described embodiment, the manner in which the internal and external members are fixed to the frame is not limited to the above and may include arrangements in which the rear frame member is fixed to the elastic member, and the main frame member to the internal member.

Although the embodiment described involved mounting second elastic members 84 and applying pressure to the first elastic members 83, it is also possible to dispense with the mounting of the second elastic members 84. When the second elastic members 84 are mounted, it is also possible to mount elastic bodies that are sufficiently soft to prevent pressure from being applied to the first elastic members 83. Such second elastic members 84, while incapable of applying pressure, can still prevent noise from being generated by the impact between the protrusions 92 and 102, and make it possible to absorb shocks during a return to the original state.

Thus, the scope of the invention should not be limited by the specific structures disclosed or the apparent initial focus on a particular structure or feature.

What is claimed is:

1. A shock absorber for mounting between a first frame member and a second frame member of a bicycle, wherein the shock absorber comprises:
   a first member adapted to couple to the first frame member;
   a second member adapted to couple to the second frame member;
   a linking mechanism concentrically coupling the first member with the second member so that the first member rotates relative to the second member in a substantially radially immovable manner;
   an elastic member disposed between the first member and the second member so that the elastic member expands and contracts in response to relative rotation of the first member and the second member;
   wherein the linking mechanism includes:
      a first bushing retained to the first member, wherein the first bushing includes:
         a first tubular part; and
         a first annular part folded away from the first tubular part; and
      a second bushing retained to the second member, wherein the second bushing includes:
         a second tubular part; and
         a second annular part folded away from the second tubular part.

2. The shock absorber according to claim 1 wherein the second member is disposed within the first member.

3. The shock absorber according to claim 1 wherein the first tubular part is disposed about an outer peripheral surface of the first member.

4. The shock absorber according to claim 3 wherein the first annular part faces an end surface of the first member.

5. The shock absorber according to claim 3 wherein the first tubular part surrounds the first member.

6. The shock absorber according to claim 5 wherein the first annular part faces an end surface of the first member.

7. The shock absorber according to claim 3 wherein the first tubular part contacts the outer peripheral surface of the first member.

8. The shock absorber according to claim 7 wherein the first tubular part has a cylindrical shape.

9. The shock absorber according to claim 7 wherein the first annular part faces an end surface of the first member.

10. The shock absorber according to claim 9 wherein the first tubular part has a cylindrical shape.

11. The shock absorber according to claim 9 wherein the first annular part contacts an end surface of the first member.

12. The shock absorber according to claim 11 wherein the first tubular part has a cylindrical shape.

13. The shock absorber according to claim 3 wherein the second tubular part faces the first tubular part.

14. The shock absorber according to claim 13 wherein the second tubular part contacts the first tubular part.

15. The shock absorber according to claim 14 wherein the first tubular part has a cylindrical shape, and wherein the second tubular part has a cylindrical shape.

16. The shock absorber according to claim 1 wherein the second member defines a central opening for receiving a bottom bracket axle therethrough.

17. The shock absorber according to claim 16 wherein the second member has a threaded inner peripheral surface defining the central opening.

18. A shock absorber for mounting between a first frame member and a second frame member of a bicycle, wherein the shock absorber comprises:

a first member adapted to couple to the first frame member;

a second member adapted to couple to the second frame member;

a linking mechanism concentrically coupling the first member with the second member so that the first member rotates relative to the second member;

an elastic member disposed between the first member and the second member so that the elastic member expands and contracts in response to relative rotation of the first member and the second member;

wherein the linking mechanism includes:
  a first bushing retained to the first member wherein the first bushing includes:
    a first tubular part disposed about an outer peripheral surface of the first member; and
    a first annular part folded away from the first tubular part; and
  a second bushing retained to the second member, wherein the second bushing includes:
    a second tubular part facing the first tubular part;
    a second annular part folded away from the second tubular part; and
    wherein the second tubular part is disposed about an outer peripheral surface of the first tubular part.

19. The shock absorber according to claim 18 wherein the second tubular part surrounds the first tubular part.

20. The shock absorber according to claim 17 wherein the second tubular part contacts the first tubular part.

21. The shock absorber according to claim 20 wherein the first tubular part has a cylindrical shape, and wherein the second tubular part has a cylindrical shape.

22. The shock absorber according to claim 18 wherein the second annular part faces the first annular part.

23. The shock absorber according to claim 22 wherein the second annular part contacts the first annular part.

24. A shock absorber for mounting between a first frame member and a second frame member of a bicycle, wherein the shock absorber comprises:

a first member adapted to couple to the first frame member;

a second member adapted to couple to the second frame member;

a linking mechanism concentrically coupling the first member with the second member so that the first member rotates relative to the second member;

an elastic member disposed between the first member and the second member so that the elastic member expands and contracts in response to relative rotation of the first member and the second member;

wherein the linking mechanism includes:
  a first bushing retained to the first member, wherein the first bushing includes:
    a first tubular part; and
    a first annular part folded away from the first tubular part; and
  a second bushing retained to the second member, wherein the second bushing includes:
    a second tubular part; and
    a second annular part folded away from the second tubular part; and
  wherein one of the first bushing and the second bushing is made of a synthetic material and the other one of the first bushing and the second bushing is made of metal.

25. A shock absorber for mounting between a first frame member and a second frame member of a bicycle, wherein the shock absorber comprises:

a first member adapted to couple to the first frame member, wherein the first member has a circular outer peripheral surface and a circular end surface;

a second member disposed within the first member and adapted to couple to the seconds frame member;

a linking mechanism concentrically coupling the first member with the second member so that the first member rotates relative to the second member in a substantially radially immovable manner;

an elastic member disposed between the first member and the second member so that the elastic member expands and contracts in response to relative rotation of the first member and the second member;

wherein the linking mechanism includes:
  a first bushing fixed to the first member and including:
    a first cylindrical part contacting the circular outer peripheral surface of the first member; and
    a first annular part folded away from the first cylindrical part and contacting the circular end surface of the first member; and a second bushing fixed to the second member and including:
    a second cylindrical part contacting the first cylindrical part of the first bushing; and
    a second annular part folded away from the second cylindrical part and contacting the first annular part of the first bushing.

26. A shock absorber for mounting between a first frame member and a second frame member of a bicycle, wherein the shock absorber comprises:

a first member adapted to couple to the first frame member, wherein the first member has a circular outer peripheral surface and a circular end surface;

a second member disposed within the first member and adapted to couple to the second frame member;

a linking mechanism concentrically coupling the first member with the second member so that the first member rotates relative to the second member;

an elastic member disposed between the first member and the second member so that the elastic member expands and contracts in response to relative rotation of the first member and the second member;

wherein the linking mechanism includes:
  a first bushing fixed to the first member and including:
    a first cylindrical part contacting the circular outer peripheral surface of the first member; and
    a first annular part folded away from the first cylindrical part and contacting the circular end surface of the first member; and a second bushing fixed to the second member and including:
    a second cylindrical part contacting the first cylindrical part of the first bushing; and
    a second annular part folded away from the second cylindrical part and contacting the first annular part of the first bushing; and
  wherein the second bushing is disposed around the outside of the first bushing.

27. A shock absorber for mounting between a first frame member and a second frame member of a bicycle wherein the shock absorber comprises:

a first member adapted to couple to the first frame member, wherein the first member has a circular outer peripheral surface and a circular end surface;

a second member disposed within the first member and adapted to couple to the second frame member;

a linking mechanism concentrically coupling the first member with the second member so that the first member rotates relative to the second member;

an elastic member disposed between the first member and the second member so that the elastic member expands and contracts in response to relative rotation of the first member and the second member;

wherein the linking mechanism includes:
  a first bushing fixed to the first member and including:
    a first cylindrical part contacting the circular outer peripheral surface of the first member; and
    a first annular part folded away from the first cylindrical part and contacting the circular end surface of the first member; and
  a second bushing fixed to the second member and including:
    a second cylindrical part contacting the first cylindrical part of the first bushing; and
    a second annular part folded away from the second cylindrical part and contacting the first annular part of the first bushing; and
wherein one of the first bushing and the second bushing is made of a synthetic material and the other one of the first bushing and the second bushing is made of metal.

* * * * *